No. 775,251.                                          Patented November 15, 1904.

UNITED STATES PATENT OFFICE.

RICHARD SCHMIDT, OF HOLZMINDEN, GERMANY, ASSIGNOR, BY MESNE ASSIGNMENTS, TO HAARMANN & REIMER, CHEMISCHE FABRIK ZU HOLZMINDEN G. M. B. H., OF HOLZMINDEN, GERMANY, A FIRM.

PROCESS OF MAKING HOMOLOGUES OF IONONE.

SPECIFICATION forming part of Letters Patent No. 775,251, dated November 15, 1904.

Original application filed August 23, 1901, Serial No. 73,026. Divided and this application filed November 7, 1902. Serial No. 130,453. (No specimens.)

*To all whom it may concern:*

Be it known that I, RICHARD SCHMIDT, a chemist and a doctor of philosophy, a subject of the Duke of Brunswick, residing at Holzminden, in the Duchy of Brunswick, German Empire, have invented a certain new and useful Process for the Manufacture of Homologues of Ionone, of which the following is a specification.

This application is a division of my prior United States application, filed August 23, 1901, Serial No. 73,026.

In United States Patents Nos. 556,943, 556,944, 583,719 it has been shown that compounds of the citral series—that is to say, the various condensation products from citral—are transformed by acids into isomerides of higher specific gravity and lower boiling-point. Thus, according to Patent No. 556,943, pseudo-ionone is converted by the action of dilute acids into ionone, and the homologues of pseudo-ionone are similarly converted into homologues of ionone. Later researches, as stated in Patents Nos. 600,429, 658,411, have shown that ionone obtained as described in Patent No. 556,943 is a mixture of variable proportions of two isomerides, alpha and beta or iso ionone, the alpha-isomer being sometimes present in much larger proportions, so that for all practical purposes the mixture represents the alpha-isomer, and the conditions have been defined in the patents referred to under which the proportion of the one or the other of these isomerides may be increased; but it has not yet been possible to obtain pure homologous beta or iso ionones.

Now I have found that a great improvement over the processes heretofore employed for the manufacture of homologous ionones is accomplished by treating the aliphatic or acyclic homologous pseudo-ionones with concentrated acids in the cold instead of submitting them to the action of dilute acids at an elevated temperature. The same result may be attained by a subsequent treatment with concentrated acids in the cold of the crude cyclic homologous ionones which are obtained from homologous pseudo-ionones by the action of dilute acids.

While in the previous processes above referred to the use of dilute acids will ordinarily produce only mixtures of isomerides of the alpha and of the beta series, I am enabled by my invention to obtain the pure isomerides, the kind of isomeride obtained depending upon the nature of the acid, those acids which, like concentrated sulfuric acid, exhibit a very marked hydrolytic action producing isomerides of the beta series, while the action of acids such as phosphoric acid, formic acid, and the like, the hydrolytic action of which is inferior to that of sulfuric acid, will not go beyond the formation of isomerides of the alpha series.

The present invention, which relates to the manufacture of homologues of alpha and beta ionone in the manner indicated above, is illustrated by the following examples:

Example I: One part of pseudo-methylionone or of (crude) alpha-methylionone is cautiously introduced into four or five parts of sulfuric acid of seventy to one hundred per cent. strength, while cooling sufficiently to keep the temperature of the mixture down to about 0° centigrade. After the brief reaction is over the mass is treated with water and the whole is extracted by a suitable solvent, such as ether. The oil left after the ether has been distilled off is purified by distillation with steam or in a vacuum or by means of some substitution product of ammonia. In this manner beta-methylionone is obtained. It boils at 140° to 155° centigrade under twenty millimeters pressure, and its specific gravity is 0.935–0.940 at 20° centigrade and its refracting-index $n_D = 1.50$–$1.52$.

Example II: The procedure is as in the preceding example, pseudo-methylionone being the parent material; but instead of sulfuric acid any other concentrated acid of weaker hydrolytic action is used—such as hydrobromic acid, hydroiodic acid, hydrochloric acid, phosphoric acid, in which case the temperature should not exceed 40° centigrade, or arsenic or formic acid, in which case heating on the water-bath is adopted. The product thus obtained boils at 140° to 155° centigrade under twenty millimeters pressure and may be purified, for instance, by means of its semi-carbazone. This purified alpha-methylionone boils at 140° to 150° centigrade under twenty millimeters pressure, (not corrected,) and its specific gravity is 0.925-0.931 at 20° centigrade, the refracting-index being $n_D = 1.50-1.51$ at 17° centigrade.

By applying the same procedure to dimethyl-pseudo-ionone there is obtained in the first case beta-dimethylionone, boiling at 155° to 160° centigrade under twenty millimeters pressure (not corrected) and of a specific gravity of 0.927 to 0.935 at 18° centigrade and with a refracting-index $n_D = 1.51-1.52$, and in the second a product boiling at 145° to 160° centigrade under twenty millimeters pressure, (specific gravity at 20° centigrade 0.915 to 0.924,) refracting-index $n_D = 1.49-1.50$, which when purified by means of its semi-carbazone yields alpha-dimethylionone of boiling-point 150° to 155° centigrade under twenty millimeters pressure, (not corrected.)

What I claim, and desire to secure by Letters Patent of the United States, is—

1. The process of converting acyclic or aliphatic homo-ionones into cyclic isomers which consists in treating such acyclic ketones with dilute acids, forming crude alpha-cyclic homo-ionones and treating said crude alpha-cyclic homo-ionones with concentrated acids, at a temperature not exceeding 40° centigrade whereby different isomers are obtained according to the concentrated acid employed.

2. The process of converting acyclic or aliphatic homo-ionones into cyclic isomers, which consists in treating such acyclic ketones with concentrated acids at a temperature not exceeding 40° centigrade, whereby different isomers are obtained according to the nature and the concentration of the acid employed and separating and purifying the resultant cyclic homo-ionones in a free state, substantially as described.

In witness whereof I have hereunto signed my name in the presence of two subscribing witnesses.

RICHARD SCHMIDT.

Witnesses:
  HENRY HASPER,
  WOLDEMAR HAUPT.